(No Model.)
E. THOMSON.
APPARATUS FOR ELECTRIC WELDING.
No. 375,784. Patented Jan. 3, 1888.
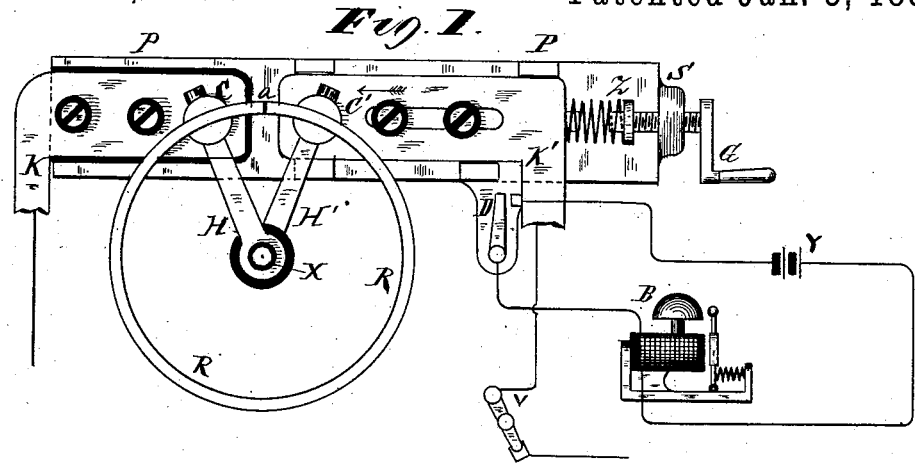
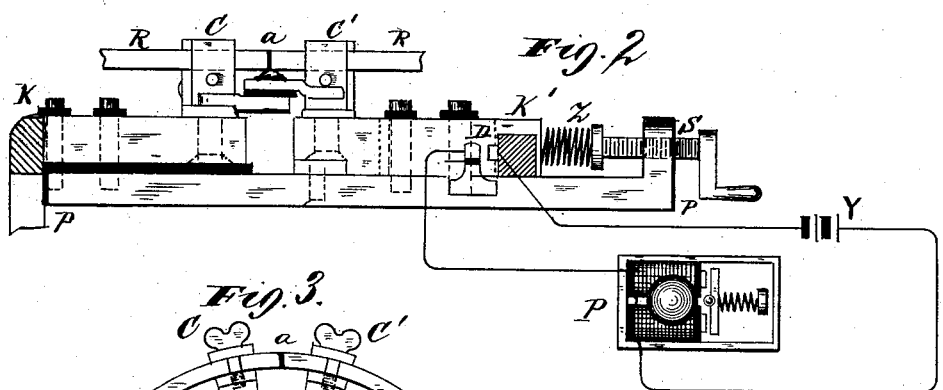
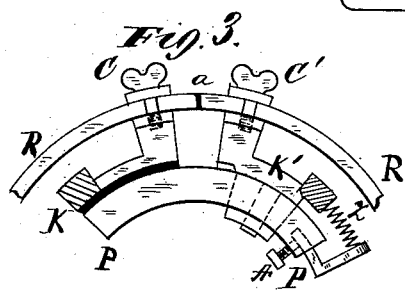
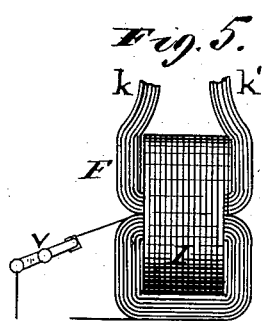
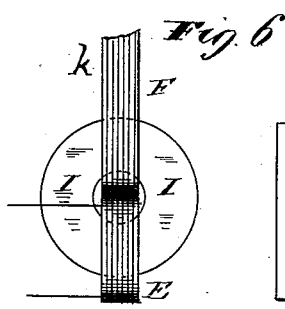
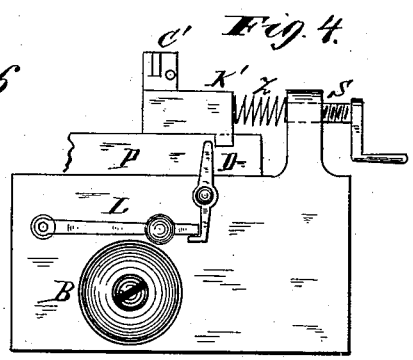
WITNESSES:
Gabriel J. W. Galster
Wm H. Cakes
INVENTOR
Elihu Thomson.
BY
Townsend & MacArthur
ATTORNEYS

United States Patent Office.

ELIHU THOMSON, OF LYNN, MASSACHUSETTS.

APPARATUS FOR ELECTRIC WELDING.

SPECIFICATION forming part of Letters Patent No. 375,784, dated January 3, 1888.

Application filed July 25, 1887. Serial No. 245,187. (No model.)

*To all whom it may concern:*

Be it known that I, ELIHU THOMSON, a citizen of the United States, and a resident of Lynn, in the county of Essex and State of Massachusetts, have invented certain new and useful Apparatus for Electric Welding, of which the following is a specification.

The present invention relates to certain improvements in apparatus for electric welding, and is especially applicable to the heating of curved forms, such as rings and other figures, wheel-tires, &c.

The object of the invention is to provide a means whereby the movements imparted to the ends of the pieces during welding shall be such as to preserve the form of the pieces when united, and this I accomplish by giving the pieces, when they are curved in shape, a motion through a curved line corresponding in each case to the form of the object and the result to be attained.

In the accompanying drawings, forming a part of this specification, Figure 1 is a plan view of an apparatus embodying my invention. Fig. 2 is a front elevation of the same. Fig. 3 shows a modified form of one part of my invention. Fig. 4 shows a modification of some of the parts of Figs. 1 and 2. Figs. 5 and 6 show a form of induction-coil especially suitable to the production of currents suitable for use with my invention.

In Figs. 1 and 2, K is a heavy bar or conductor, which is substantially connected to one of the terminals of a source of very heavy electric currents, K' being another heavy bar or conductor attached to the other terminal of the said source. The piece K is, however, fixed in position, but kept insulated from a guiding-bar or bed-plate, P P. The block K' is, however, movable along the bed-plate under the influence of a screw, S, and spring Z, as shown in Figs. 1 and 2, in a straight line passing through the other block, K, and it is suitably guided, so as not to change its direction of motion. The pieces K K' carry clamping-jaws C C', respectively, for holding the piece or pieces to be operated upon—that is, to be welded electrically by the passage of a powerful electric current across their abutted sections. For example, a ring, R R, representing, it may be, a wheel-tire to be welded at the point *a* between the clamps, is shown. The clamping-jaws C C' are not fixed firmly to the pieces K K', but are allowed to rotate around their own axes. They may set by a swivel or be pivoted upon the pieces K K', so as to be moderately free to move, and yet sufficiently in contact with the pieces K K' to carry the current necessary for the welding operation. The parts so organized will permit the motion of the opposed portions of the ring to be joined under the influence of the screw S and spring Z, which spring may be made to exert more or less elastic force by means of the crank G; but to further augment the motion imparted to the opposed portions of the ring R R to be joined the swivel or pivoted clamps may each have an extension-arm, H H', pivoted but insulated from each other at the center of the ring to be made or welded, as at X. This insures the swinging or turning of the clamps C C' as the parts of the ring are pushed together by the movement of the block K', thus keeping the ends of the abutted portions directly opposite.

I sometimes provide an alarm apparatus consisting of an electric bell put into the circuit by the closing of a contact at D, when the block K', which carries one of the contacts, is moved during the welding to a predetermined point. Such an alarm apparatus would consist of an electric bell whose circuit was completed at the contact at D, and into which circuit is placed a suitable source of current, as a battery, Y. As soon as the contact-point carried by K' touches the fixed contact at D, the bell B is struck by its hammer on account of the energizing of its magnet and gives the signal by which the operator knows that the welding operation is completed, and a switch, V, can then be used to cut off the welding-current; or other means of stopping the action may be employed.

In Fig. 3 is shown a bed-plate or guide-plate, P P, curved from the same center as that of the curved pieces R R to be operated upon. The clamping-piece C is fixed, but insulated from the plate, while C' K' are movable, as before, being, however, guided on the curved surface of the bed-plate P. The power of the spring Z may be adjusted by a movable piece which subjects it to a greater or less compression. The pieces are put, as before, between the clamps at C C', and the current is carried into the clamps. The clamp C', having a curved motion over the bed-plate P P, keeps the pieces in accurate relative position during the yielding action of the welding. Instead of an electro-magnet signal arrangement for indicating the proper approach of the clamps, as shown in Figs. 1 and 2, the arrangement may be modified, as in Fig. 4. In this case a small stud on the moving piece K' simply trips, on a given movement, a detent-lever, D, which at other times holds up a hammer-carrying lever for the bell B, so that when the pieces to be welded have yielded to the predetermined degree the hammer-lever will be released by the detent-lever D upon the stud or projection on K' striking it during movement.

In the operation of my devices herein described it is presumed that a suitable source of current be connected to the clamps which hold the pieces, such current being a heavy current of very low electro-motive force and provided by any suitable apparatus. An induction-coil whose primary is supplied by comparatively high-potential currents of small volume and whose secondary gives out large currents with low electro-motive force is excellent for the purpose.

Figs. 5 and 6 show a simple form of such an apparatus. The primary coil E is shown as wound through the center of a series of iron disks or washers, I I, piled laterally, and the secondary F is simply a copper strand or heavy bar, passing also through the center of the pile of perforated disks or washers, and whose free ends k k' are connected to the corresponding pieces, K K', of the preceding figures. Alternating currents circulating in the coil E give rise, as before, to heavy welding-currents in the convolution F.

What I claim as my invention is—

1. In an electric welding apparatus, movable clamping-jaws adapted to be forced together during the welding process on a line corresponding to the curve of the pieces to be welded, and means for passing a welding-current through the pieces, substantially as described.

2. In an electric welding apparatus, the combination, with a swiveled or pivoted stationary clamping-jaw, of a swiveled or pivoted moving jaw adapted to be forced toward the stationary jaw during the operation of welding, and means for passing a welding-current through the pieces, substantially as specified.

3. In an electric welding apparatus, swiveled or pivoted clamping-jaws, one of which is movable to and from the other, and means for passing a welding-current through the pieces, substantially as specified.

4. In an electric welding apparatus, swiveled or pivoted clamping-jaws, one of which is mounted on a slide movable to and from the other jaw, and means for passing a welding-current through the pieces.

5. In an electric welding apparatus, the combination of pivoted or swiveled clamping-jaws, one of which is adapted to be forced toward the other in the operation of welding, pivoted guiding-arms for said jaws turning on a center substantially coincident with the center of the curved pieces to be welded and giving a partially-rotating motion to said clamping-jaws, and means for passing the welding-current through the pieces, substantially as specified.

6. In an electric welding apparatus, the combination of clamping-jaws adapted to be forced together during the operation of the welding and a signaling apparatus actuated by the movement of said jaws to a predetermined point.

7. In an electric welding apparatus, the combination of a stationary clamping-jaw, a movable clamping-jaw mounted on a slide, and a signaling apparatus actuated by the movement of said slide at a predetermined point.

Signed at Lynn, in the county of Essex and State of Massachusetts, this 20th day of July, A. D. 1887.

ELIHU THOMSON.

Witnesses:
OTIS K. STUART,
J. W. GIBBONEY.